United States Patent
Kruglick (10) Patent No.: US 9,552,228 B2
(45) Date of Patent: Jan. 24, 2017

(54) INSTRUCTION SET EXTENSION CONCEALMENT IN DATA CENTERS

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

(*) Notice: Subject to any disclaimer, the term of this patent is extended or adjusted under 35 U.S.C. 154(b) by 32 days.

(21) Appl. No.: 14/479,945

(22) Filed: Sep. 8, 2014

(65) Prior Publication Data

US 2016/0070599 A1   Mar. 10, 2016

(51) Int. Cl.
*G06F 9/455*   (2006.01)
*G06F 9/46*   (2006.01)
*G06F 9/50*   (2006.01)

(52) U.S. Cl.
CPC ............. *G06F 9/5027* (2013.01); *G06F 9/461* (2013.01); *G06F 9/50* (2013.01); *G06F 9/5038* (2013.01); *G06F 9/505* (2013.01)

(58) Field of Classification Search
CPC ........................................ G06F 9/445–9/5094
See application file for complete search history.

(56) References Cited

U.S. PATENT DOCUMENTS

| | | | |
|---|---|---|---|
| 8,296,761 | B2 | 10/2012 | Ueno et al. |
| 8,661,443 | B2 * | 2/2014 | Potkonjak ............. G06F 9/4887 718/102 |
| 8,667,020 | B2 | 3/2014 | Zhaofu et al. |
| 2008/0244506 | A1 | 10/2008 | Killian et al. |
| 2010/0153945 | A1 * | 6/2010 | Bansal ................... G06F 9/4881 718/1 |
| 2011/0083132 | A1 * | 4/2011 | Laor .................... G06F 9/45533 718/1 |

(Continued)

OTHER PUBLICATIONS

Leupers, R. et al., "A Design Flow for Configurable Embedded Processors based on Optimized Instruction Set Extension Synthesis", 2006, pp. 1-6.*

(Continued)

*Primary Examiner* — Thuy Dao
*Assistant Examiner* — Christopher Franco
(74) *Attorney, Agent, or Firm* — Moritt Hock & Hamroff LLP; Steven S. Rubin, Esq.

(57) ABSTRACT

Technologies are generally described for systems, devices and methods effective to execute a first computing task by a processor of a data center. In some examples, the first computing task may be executed using an instruction set extension. Execution of the first computing task using the instruction set extension may require a first number of clock cycles. In other examples, execution of the first computing task without using the instruction set extension may require a second number of clock cycles. In some examples, a savings value may be determined. The savings value may represent a difference between the first number of clock cycles and the second number of clock cycles. An amount of processing time may be allocated on the processor to a second computing task. The amount of processing time may be based on the savings value. The second computing task may be different from the first computing task.

23 Claims, 8 Drawing Sheets

(56) References Cited

U.S. PATENT DOCUMENTS

| | | | | |
|---|---|---|---|---|
| 2011/0225591 | A1* | 9/2011 | Wada | G06F 9/45533 718/103 |
| 2011/0239220 | A1* | 9/2011 | Gibson | G06F 1/3206 718/103 |
| 2012/0159507 | A1* | 6/2012 | Kwon | G06F 9/5088 718/104 |
| 2013/0227585 | A1* | 8/2013 | Ichikawa | G06F 9/50 718/104 |
| 2013/0304903 | A1 | 11/2013 | Mick et al. | |
| 2013/0346974 | A1 | 12/2013 | Hofffman et al. | |
| 2014/0019965 | A1* | 1/2014 | Neuse | G06F 9/45533 718/1 |
| 2014/0053153 | A1* | 2/2014 | Kozakai | G06F 9/45533 718/1 |
| 2014/0173614 | A1* | 6/2014 | Konik | G06F 9/4881 718/104 |
| 2014/0331234 | A1* | 11/2014 | Gibson | G06F 1/3206 718/103 |
| 2015/0156057 | A1* | 6/2015 | Leung | G06F 8/41 709/223 |

OTHER PUBLICATIONS

Pozzi, Laure, et al., "Exact and Approximate Algorithms for the Extension of Embedded Processor Instruction Sets", 2006, pp. 1209-1229.*
Pothineni, Nagaraju, et al., "A High-Level Synthesis Flow for Custom Instruction Set Extensions for Application-Specific Processors", 2010, pp. 707-712.*
Clark, Nathan, et al., "An Architecture Framework for Transparent Instruction Set Customization in Embedded Processors", 2005, pp. 1-12.*
Arnold, Oliver, et al., "An Application-Specific Instruction Set for Accelerating Set-Oriented Database Primitives", Jun. 2014, pp. 767-778.*
Simao, Jose, et al., "Resource-Aware Scaling of Multi-threaded Java Applications in Multi-tenancy Scenarios", 2013, pp. 445-451.*
"A supercomputer at your fingertips," accessed at http://web.archive.org/web/20140626004012/http://www.picloud.com/, accessed on Aug. 28, 2014, pp. 1-3.
"Advanced Vector Extensions," accessed at http://web.archive.org/web/20140816124732/http://en.wikipedia.org/wiki/Advanced_Vector_Extensions, last modified on Aug. 8, 2014, pp. 1-9.
"Amazon EC2 Instances," accessed at http://web.archive.org/web/20140825220736/http://aws.amazon.com/ec2/instance-types/, accessed on Aug. 25, 2014, pp. 1-12.
"Intel® Math Kernel Library," accessed at http://web.archive.org/web/20140816115337/https://software.intel.com/en-us/intel-mkl, accessed on Aug. 28, 2014, pp. 1-2.
"Intel® Xeon® Processor X5550," accessed at http://web.archive.org/web/20140707171410/http://ark.intel.com/products/37106/Intel-Xeon-Processor-X5550-8M-Cache-2_66-GHz-6_40-GTs-Intel-QPI, accessed on Aug. 28, 2014, pp. 1-5.
Clark, J., "Inside Intel's secret super-chips: If you've got the millions, its got the magic," accessed at http://web.archive.org/web/20140808084544/http://www.theregister.co.uk/2013/11/06/intel_custom_chips_update/, posted on Nov. 6, 2013, pp. 1-4.
Gekko, G., "Intel Sandy Bridge Microarchitecture events," accessed at http://web.archive.org/web/20140810154215/http://oprofile.sourceforge.net/docs/intel-sandybridge-events.php, posted on Jul. 29, 2013, pp. 1-10.
Higginbotham, S., "Google may be making its own custom server chips. It should—Tech News and Analysis," accessed at http://web.archive.org/web/20140819064128/http://gigaom.com/2013/12/12/google-may-be-making-its-own-custom-server-chips-it-should/, posted on Dec. 12, 2013, pp. 1-6.
Intel® Xeon® Processor E5-2665, accessed at http://web.archive.org/web/20140808150029/http://ark.intel.com/products/64597/Intel-Xeon-Processor-E5-2665-20M-Cache-2_40-GHz-8_00-GTs-Intel-QPI, accessed on Aug. 28, 2014, pp. 1-7.
Jackson, M.A., "ARM V7 events," accessed at http://web.archive.org/web/20140810154515/http://oprofile.sourceforge.net/docs/arm-v7-events.php, accessed on Aug. 28, 2014, pp. 1-3.
Ou, Z., et al., "Exploiting Hardware Heterogeneity Within the Same Instance Type of Amazon EC2," In Proceedings of the 4th USENIX Conference on Hot Topics in Cloud Ccomputing, 2012, pp. 4-4.
Rotem, E., et al., "Power Management Architecture of the Second Generation Intel Core Microarchitecture," Sandy Bridge power architect, Hot Chips, Aug. 2011, pp. 1-33.
Staley, A., "When EC2 Hardware Changes Underneath You . . . " accessed at http://web.archive.org/web/20140212141558/http://blog.picloud.com/2013/01/08/when-ec2-hardware-changes-underneath-you/, posted on Jan. 8, 2013, pp. 1-4.
"Lapack — Linear Algebra PACKage," accessed at http://web.archive.org/web/20140829065656/http://www.netlib.org/lapack/, Last updated on Nov. 16, 2013, pp. 8.
"MIT Enterprise Forum Start-up Presentation: Nimbix," accessed at http://www.slideshare.net/mitdfw/mit-enterprise-forum-startup-presentation-nimbix, Published on Mar. 12, 2012, pp. 12.
"VMInjector—DLL Injection tool to unlock guest VMs," accessed at http://web.archive.org/web/20140703135703/http://www.secforce.com/blog/2012/11/vminjector/, accessed on Feb. 26, 2016, pp. 2.
Aroca, R. V., and Gonçalves, L. M. G., "Towards green data centers: A comparison of x86 and ARM architectures power efficiency," Journal of Parallel and Distributed Computing, vol. 72, Issue 12, pp. 1770-1780 (Dec. 2012).
Chen, Y-K, et al., "Implementation of H.264 Encoder and Decoder on Personal Computers," Journal of Visual Communication and Image Representation, vol. 17, Issue 2, pp. 509-532 (Apr. 2006).
Chen, Z., et al., "Fast Integer Pel and Fractional Pel Motion Estimation for JVT,"6th Meeting Joint Video Team (JVT) of ISO/IEC MPEG & ITU-TVCEG, pp. 1-13 (Dec. 5-13, 2002).
Chun, B-G, et al., "An Energy Case for Hybrid Datacenters," ACM SIGOPS Operating Systems Review, vol. 44, Issue 1, pp. 76-80 (Mar. 12, 2010).
Conover, M., and Chiueh, T., "Code Injection From the Hypervisor: Removing the need for in-guest agents," Core Research Group, Symantec Research Labs, pp. 36 (Jul. 10, 2009).
Hameed, R., et al., "Understanding Sources of Inefficiency in General-Purpose Chips," Proceedings of the 37th Annual International Symposium on Computer Architecture, pp. 37-47 (Jun. 19, 2010).
Iverson, V., et al., "Real-time H.24-AVC codec on Intel architectures," International Conference on Image Processing, vol. 2, pp. 757-760 (Oct. 24-27, 2004).
Kim, S., et al., "Group-Based Memory Deduplication for Virtualized Clouds," Euro-Par 2011: Parallel Processing Workshops, vol. 7156, pp. 387-397 (2012).
Mora, J., "Understanding the Bulldozer Architecture through the LINPACK Benchmark," accessed at https://www.youtube.com/watch?v=myIUMnRtPnM&list=PLF6354E41700BA2FC&index=2, Published on Jun. 24, 2012, pp. 24.
Shimpi, A. L., "Intel Plans on Bringing Atom to Servers in 2012, 20W SNB Xeons in 2011," accessed at http://web.archive.org/web/20140817194854/http://anandtech.com/show/4222/intel-plans-on-bringing-atom-to-servers-in-2012-20w-snb-xeons-in-2011, accessed on Mar. 15, 2011, pp. 4.
Xu, J., et al., "Efficient fast ME predictions and early-termination strategy based on H.264 statistical characters," Proceedings of the 2003 Joint Conference of the Fourth International Conference on Information, Communications and Signal Processing, 2003 and Fourth Pacific Rim Conference on Multimedia, vol. 1, pp. 218-222 (Dec. 15-18, 2003).
Yin, P., et al., "Fast Mode Decision and Motion Estimation for JVT/H.264," Proceedings. 2003 International Conference on Image Processing, vol. 3, pp. III-853-III-856 vol. 2 (Sep. 14-17, 2003).

* cited by examiner

500 A computer program product.

502 A signal bearing medium.

504
At least one of

One or more instructions for executing a first computing task by a processor of a data center; or One or more instructions for executing the first computing task by the processor using an instruction set extension, execution of the first computing task using the instruction set extension may consume a first number of clock cycles, and execution of the first computing task without using the instruction set extension may consume a second number of clock cycles; or One or more instructions for determining a savings value, the savings value may represent a difference between the first number of clock cycles and the second number of clock cycles; or

One or more instructions for allocating an amount of processing time on the processor to a second computing task, the amount of processing time may be based on the savings value, and the second computing task may be different from the first computing task.

506  A computer-readable medium

508  A recordable medium

510  A communications medium

Fig. 5

INSTRUCTION SET EXTENSION CONCEALMENT IN DATA CENTERS

BACKGROUND

Unless otherwise indicated herein, the materials described in this section are not prior art to the claims in this application and are not admitted to be prior art by inclusion in this section.

Data centers may include one or more computing devices. For example, a data center may include various processing elements and/or memories. Data centers may be configured to perform computing tasks. For example, data centers may perform computing tasks according to one or more service level agreements. Service level agreements may specify performance requirements for execution of particular tasks at a data center.

SUMMARY

In some examples, methods to execute a first computing task by a processor of a data center are generally described. In various examples, the methods may include executing the first computing task by the processor using an instruction set extension. In some examples, execution of the first computing task using the instruction set extension may require a first number of clock cycles. In some other examples, execution of the first computing task without using the instruction set extension may require a second number of clock cycles. In various examples, the methods may further include determining a savings value. In some examples, the savings value may represent a difference between the first number of clock cycles and the second number of clock cycles. In other examples, the methods may further include allocating an amount of processing time on the processor to a second computing task. In some examples, the amount of processing time may be based on the savings value. In some other examples, the second computing task may be different from the first computing task.

In some examples, data centers are generally described. In various examples, the data centers may include a processor. In some other examples, the data centers may include an instruction set extension configured to be in communication with the processor. In still other examples, the data centers may include a memory configured to be in communication with the processor. The memory may be effective to store instructions. In some examples, the processor may be effective to, in accordance with the instructions, execute a first computing task through use of the instruction set extension. In various examples, execution of the first computing task through use of the instruction set extension may require a first number of clock cycles. In some other examples, execution of the first computing task without use of the instruction set extension may require a second number of clock cycles. In some examples, the processor may be further effective to, in accordance with the instructions, determine a savings value. In some examples, the savings value may represent a difference between the first number of clock cycles and the second number of clock cycles. In some other examples, the processor may be further effective to, in accordance with the instructions, allocate an amount of processing time on the processor to a second computing task. In various examples, the amount of processing time may be based on the savings value. In some examples, the second computing task may be different from the first computing task.

In some examples, data centers are generally described. In some examples, the data centers may include two or more first processors effective to execute first computing tasks. In various other examples, the data centers may include two or more second processors. In some examples, the second processors may include instruction set extensions. In some other examples, the second processors may be effective to execute the first computing tasks and second computing tasks. In various other examples, the data centers may include a bid manager configured to be in communication with the first processors and the second processors. In some examples, the bid manager may be effective to receive first bids and second bids. In various examples, the first bids may be associated with first computing tasks to be performed by one of the first processors. In various other examples, the second bids may be associated with second computing tasks to be performed by one of the second processors through use of the instruction set extensions. In still other examples, the bid manager may be further effective to place the first bids in a first auction pool for the first processors. In some other examples, the bid manager may be further effective to place the second bids in a second auction pool for the second processors. In various examples, the bid manager may be further effective to determine that a first quantity of the first bids may be greater than a quantity of the first processors. In various examples, the bid manager may be further effective to, in response to the determination, copy some of the first bids from the first auction pool to the second auction pool. In some examples, the bid manager may be further effective to control the first and second processors based on the first and second bids.

In some examples, data centers are generally described. In some examples, the data centers may include two or more first processors effective to execute first computing tasks. In some other examples, the data centers may further include two or more second processors. In various examples, the second processors may include instruction set extensions. In still other examples, the second processors may be effective to execute the first computing tasks and second computing tasks. In other examples, the data centers may further include a bid manager configured to be in communication with the first processors and the second processors. In some examples, the bid manager may be effective to identify a first pool of available first processors. In various cases, the first pool of available first processors may include a first pool quantity. In some examples, the first pool quantity may be based on a quantity of the first processors and a quantity of the second processors. In some other examples, the bid manager may be further effective to identify a second pool of available second processors. In some examples, the second pool of available second processors may include a second pool quantity based on the quantity of the second processors. In other examples, the bid manager may be further effective to receive a bid for a particular second processor. In some other examples, the bid manager may be further effective to reduce the first pool quantity based on receipt of the bid. In various other examples, the bid manager may be further effective to control the first and second processors based on the first and second pools.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to instruction set extension concealment in data centers.

Briefly stated, technologies are generally described for systems, devices and methods effective to execute a first computing task by a processor of a data center using an instruction set extension. For example, the first computing task may issue instructions capable of execution through use of the instruction set extension. For example, the first computing task may issue a fused add-multiply instruction configured to perform addition and multiplication of two or more values using a fused add-multiply instruction set extension. In various examples, execution of the first computing task using the instruction set extension may require a first number of clock cycles. In other examples, execution of the first computing task without using the instruction set extension may require a second number of clock cycles. In some examples, a savings value may be determined. The savings value may represent a difference between the first number of clock cycles and the second number of clock cycles. An amount of processing time may be allocated on the processor to a second computing task, based on the savings value. For example, processing time may be allocated to another virtual machine or to the data center. The second computing task may be different from the first computing task. For example, the first computing task may include an execution of a first virtual machine and the second computing task may include an execution of a second virtual machine. In some examples, use of an instruction set extension may be concealed from either the first or second virtual machine.

Figure 1:
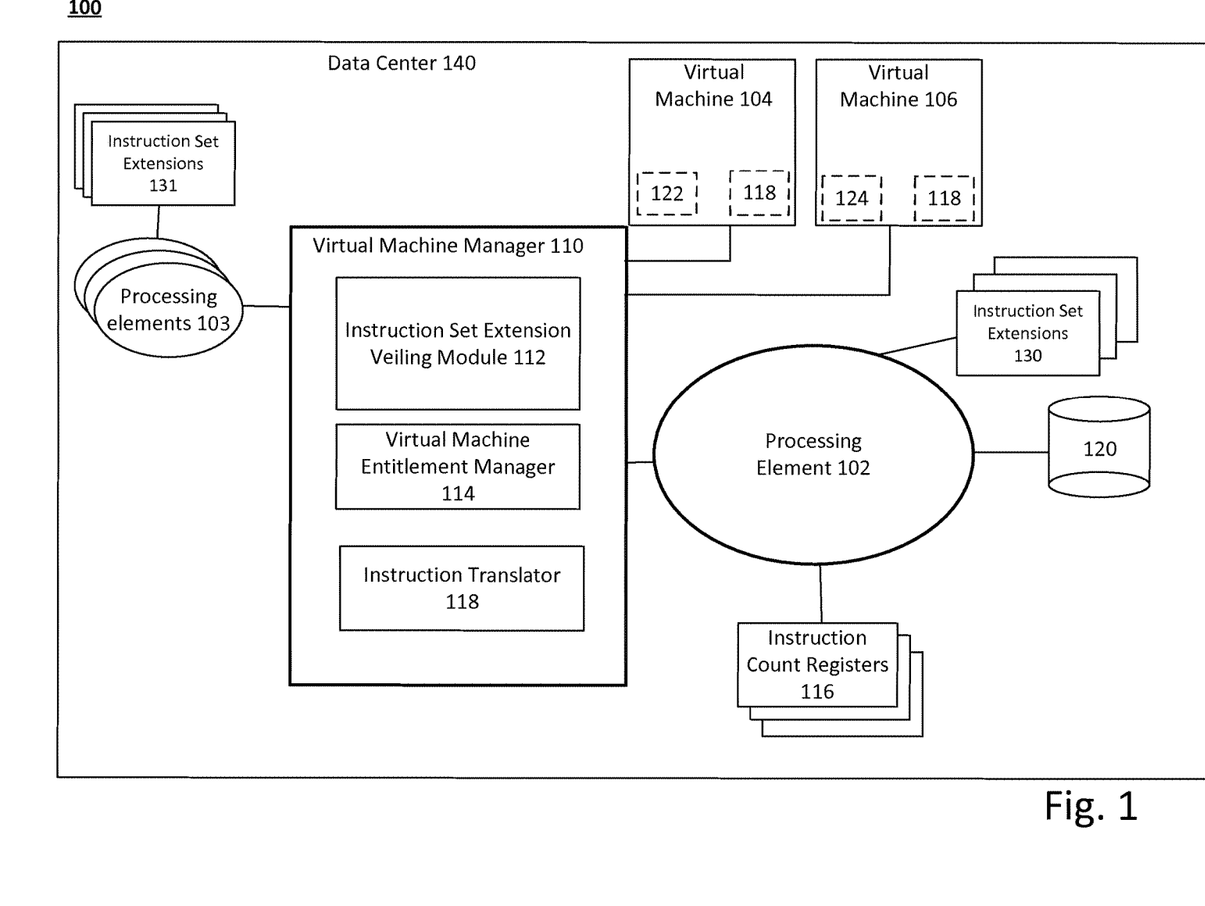
FIG. 1 illustrates an example system that can be utilized to implement instruction set extension concealment in data centers.

FIG. 1 illustrates an example system 100 that can be utilized to implement instruction set extension concealment in data centers, arranged in accordance with at least some embodiments described herein. As depicted, system 100 may include a data center 140. Data center 140 may include processing elements 102, 103, instruction set extensions ("ISEs") 130, 131, a system memory 120, and a virtual machine manager 110, each configured to be in communication with each other. In some examples, processing elements 102, 103 may include multicore processors, and may include one or more processor cores. Processing elements 102, 103 may be configured to perform one or more computing tasks. In some examples, computing tasks may include tasks performed by one or more virtual machines such as, for example, virtual machines 104 and/or 106. In some other examples, computing tasks may include tasks performed for data center 140. In some examples, tasks performed for data center 140 may include tasks such as software updates for data center 140 and/or other tasks which are not performed by a virtual machine. In various examples, processing element 102 may execute virtual machines 104 and/or 106. As will be described in further detail below, processor time savings obtained through use of instruction set extensions, such as ISEs 130, 131, may be concealed from one or more virtual machines being executed at data center 140. Additionally, in some further examples, processing time may be allocated to one or more other computing tasks of data center 140, based on the processor time savings.

Virtual machine manager 110 may be hardware or some combination of hardware and instructions executable on the hardware. Virtual machine manager 110 may be effective to control creation and/or operation of virtual machines (such as, for example, virtual machines 104 and/or 106). In some examples, virtual machine manager 110 may create and/or control operation of virtual machines 104 and/or 106 through communication with processing elements 102 and/or 103. In other examples, images of virtual machines 104 and/or 106 may be stored in system memory 120.

Instruction set extensions 130, 131 may be circuits or other hardware configured to perform one or more computing operations. In an example, instruction set extensions 130, 131 may perform operations which match or exceed the base instruction set architecture of processing elements 102 and/or 103. For example, a fused add-multiply instruction may be an instruction set extension for the base X86 instruction set. In some cases, processing elements 102, 103 may utilize instruction set extensions 130, 131 to perform a particular computing operation in fewer steps, clock cycles, and/or less time relative to a performance of the particular computing operation by an identical processing element without instruction set extensions 130, 131.

In some examples, virtual machines 104 and 106 may include ISE aware drivers 122 and 124, respectively. ISE aware drivers 122 and/or 124 may be effective to generate instruction set extension instructions. Instruction set extension instructions may be effective to use ISEs 130 and/or 131 to execute various computing tasks. In some examples, ISE aware drivers 122 and/or 124 may produce instruction set extension instructions which may be effective to execute computing tasks using instruction set extensions 130. In the example, using instruction set extension instructions with ISE 130 may require fewer clock cycles and/or less time to complete a particular computing task relative to use of instructions which are not configured to use ISE 130. Instruction count registers 116 may be configured to store count values which designate the number of times a computing task calls an instruction to use particular instructions of a particular virtual machine. A particular instruction count register 116 may be associated with a particular ISE, including ISEs 130 and/or 131. In some examples, count values stored in instruction count registers 116 may be used in a determination of processor time savings associated with use of instruction set extensions 130, 131.

Virtual machine manager 110 may include an instruction set extension veiling module 112, a virtual machine entitlement manager 114, and/or an instruction translator 118. Instruction set extension veiling module 112 may be hardware or some combination of hardware and instructions executable on the hardware. As will be discussed in further detail below, instruction set extension veiling module 112 may be effective to conceal the presence of instruction set extensions 130 from virtual machines 104, 106 and/or from other devices which may access data center 140. Virtual machine entitlement manager 114 may be hardware or some combination of hardware and instructions executable on the hardware effective to control and/or schedule virtual machine access to processing elements 102 and/or 103. Instruction translator 118 may be hardware or some combination of hardware and instructions executable on the hardware effective to translate instructions generated by a virtual machine into instruction set extension instructions. For example, instruction translator 118 may use binary translation techniques to produce instruction set extension instructions which may use ISEs 130 and/or 131 to perform one or more computing operations or tasks.

Figure 2:
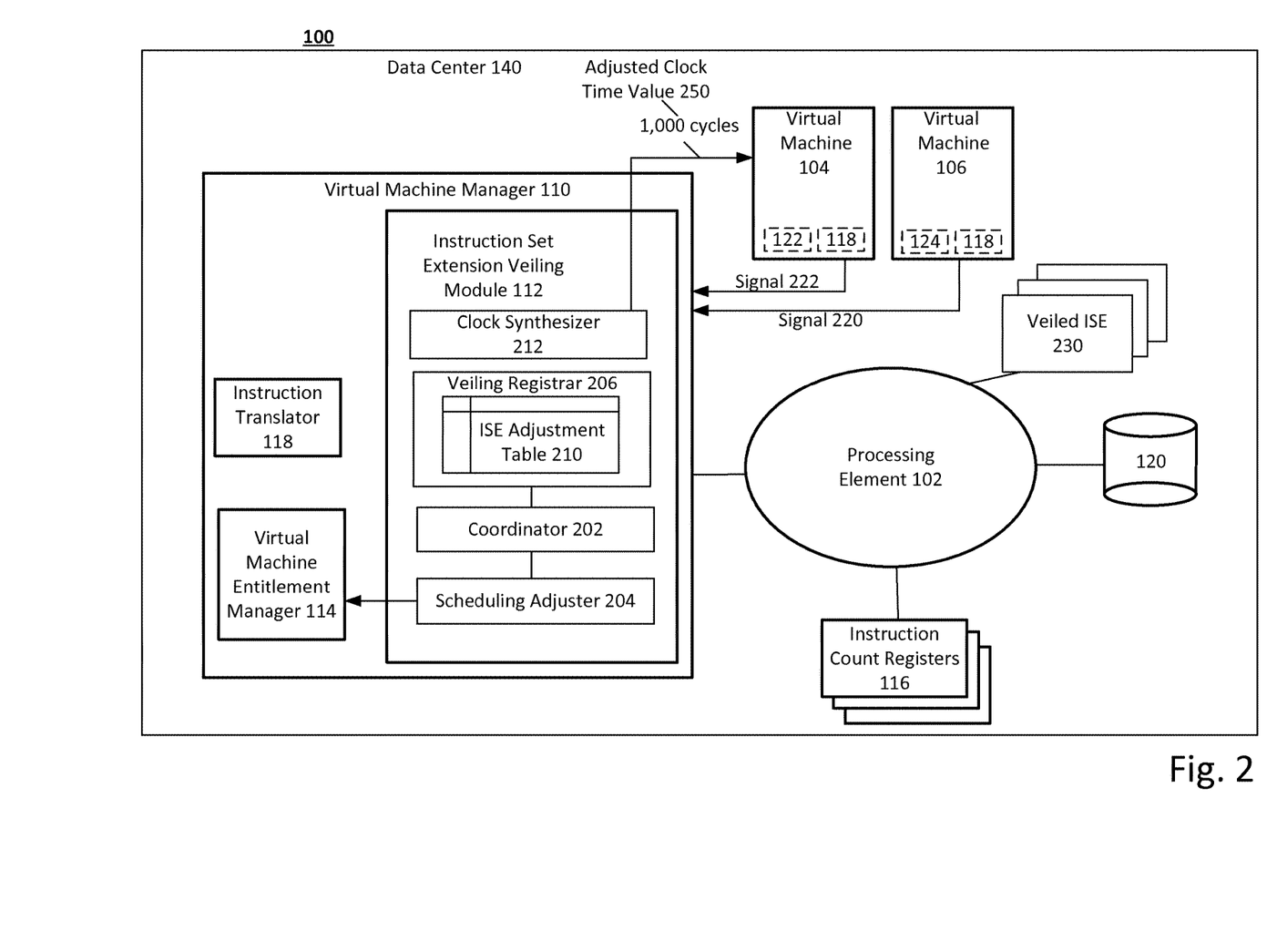
FIG. 2 depicts the example system of FIG. 1, with additional details relating to an instruction set extension veiling module.

FIG. 2 depicts example system 100 of FIG. 1, with additional details relating to an instruction set extension veiling module, arranged according to at least some embodiments described herein. Those components in FIG. 2 that are labeled identically to components of FIG. 1 will not be described again for the purposes of clarity and brevity.

Instruction set extension veiling module 112 may include a coordinator 202, a scheduling adjuster 204, a veiling registrar 206, and/or a clock synthesizer 212, all configured to be in communication with one another. Coordinator 202 may be hardware or some combination of hardware and instructions executable on the hardware. Coordinator 202 may be effective to receive a signal (including signals 220, 222) from virtual machines, including virtual machines 104 and/or 106, from VMM 110, or from other supervisory modules such as the auction module described below. Signals 220, 222 may indicate those ISEs which were explicitly included as features of the processor sold for processing the particular virtual machine. ISEs of the processor which were not explicitly included as features when the processor was sold for execution of the virtual machine may be termed "veiled ISEs." In response to signals 220, 222, coordinator 202 may determine instruction count values from instruction count registers 116 for veiled ISEs. As will be discussed further below, benefits from use of veiled ISEs may be hidden and/or concealed from the particular virtual machine.

For example, processing for virtual machine 104 may have been sold at data center 140 without use of a particular ISE. In the example, the particular ISE may be a veiled ISE 230 that exists on processing element 102, but which VM 104 has not purchased. For example, virtual machine 104 may have purchased a lower level of service without specified use of veiled ISE 230. Virtual machine 104 may send signal 222 to coordinator 202 indicating that processing for virtual machine 104 was sold without veiled ISE 230. In response, coordinator 202 may determine a count value from the particular instruction count register 116 which corresponds to usage of veiled ISE 230. In the example, the count value may represent the number of times that virtual machine 104 issued instructions that used veiled ISE 230.

Coordinator 202 may consult veiling registrar 206 to determine a number of clock cycles saved each time a particular ISE is used. Veiling registrar 206 may include ISE adjustment table 210. ISE adjustment table 210 may be a data structure configured to store associations between particular ISEs and savings values associated with use of the particular ISEs or sub-instructions thereof. For example, a savings value stored in ISE adjustment table 210 may represent a difference between the number of clock cycles required to execute the instruction through use of the particular ISE instruction and the number of clock cycles required to execute the instruction without use of the particular ISE instruction. Veiling registrar 206 may provide the number of clock cycles saved for a particular ISE to coordinator 202.

To continue the above example, coordinator 202 may consult veiling registrar 206 to determine a savings value associated with the use of veiled ISE 230. In response, veiling registrar 206 may perform a lookup in ISE adjustment table 210 to determine the number of clock cycles saved each time a veiled ISE 230 instruction is used (e.g., the savings value). Veiling registrar 206 may send the savings value to coordinator 202. Coordinator 202, virtual machine manager 110, and/or processing element 102 may multiply the savings value by the count value from instruction count register 116 to determine a total savings value saved by the particular virtual machine through use of the particular ISE. In the example, veiling registrar 206 may perform a lookup in ISE adjustment table 210 to determine a savings value (in terms of a number of clock cycles) each time veiled ISE 230 is used. In the example, use of veiled ISE 230 may save 100 clock cycles. Veiling registrar 206 may send the savings value to coordinator 202. Coordinator 202 may multiply the savings value by the count value stored in the particular instruction count register 116 corresponding to the veiled ISE 230 instruction. In the example, the count value may indicate that veiled ISE 230 has been used 150 times. Accordingly, coordinator 202, virtual machine manager 110, and/or processing element 102 may determine that 15,000 clock cycles have been saved using veiled ISE 230 (100× 150=15,000). The 15,000 saved clock cycles may represent a total savings value. In some examples, count values stored in instruction count registers 116 may be reset by virtual machine manager 110 prior to passing control of processing element 102 to virtual machines 104, 106.

An indication of the number of clock cycles saved through the use of a veiled ISE may be sent from coordinator 202 to scheduling adjuster 204. Scheduling adjuster 204 may be, for example, hardware or some combination of hardware and instructions executable on the hardware, effective to adjust scheduling of virtual machine access to processing element 102 based on the amount of savings realized through use of the veiled ISEs. In some examples, scheduling adjuster 204 may allocate processor time, such as clock cycles and/or an amount of processing time, saved through use of veiled ISEs to other virtual machines and/or to other data center tasks (which may include idle tasks or other power saving strategies). Adjustments to scheduling of virtual machine access may be sent from scheduling adjuster 204 to virtual machine entitlement manager 114 of virtual machine manager 110. Entitlement manager 114 may control and/or schedule virtual machine access to processing elements 102 and/or 103 according to the adjustments sent from scheduling adjuster 204.

In some examples, clock synthesizer 212 may be hardware or some combination of hardware and instructions executable on the hardware which may be effective to adjust a processor clock time value. In some examples, a processor clock time value may be a number of clock cycles and/or an amount of time elapsed during execution of one or more computing tasks by a processor. A processing element executing a virtual machine may periodically report a processor clock time value to the virtual machine, for example when clock instructions are issued. Clock synthesizer 212 may report an adjusted clock time value 250 to a virtual machine that is using a particular veiled ISE. Clock synthesizer 212 may adjust the processor clock time value reported to the virtual machine, so that the clock time value reflects the number of clock cycles which would be expected to elapse during execution of a particular set of instructions without the use of any veiled ISEs.

For example, execution of an instruction set extension instruction to perform a computing task by veiled ISE 230 may require 20 clock cycles. By contrast, performance of the same task without use of veiled ISE 230 may require 1,000 clock cycles. Processing element 102 may perform the computing task using veiled ISE 230. During performance, 20 clock cycles may elapse. Clock synthesizer 212 may adjust the processor clock time value from 20 to 1,000 (adjusted clock time value 250 may be 1,000 cycles). Clock synthesizer 212 may report adjusted clock time value 250 (1,000 cycles) to the virtual machine 104, which issued the instructions to perform the computing task, effectively concealing the use of veiled ISE 230 by processing element 102. In an example, concealing the use of veiled ISE 230 may allow virtual machine 104 to receive the processing paid for at data center 140, while data center 140 may be able to exploit the processor time savings realized from use of veiled ISE 230.

Figure 3A:
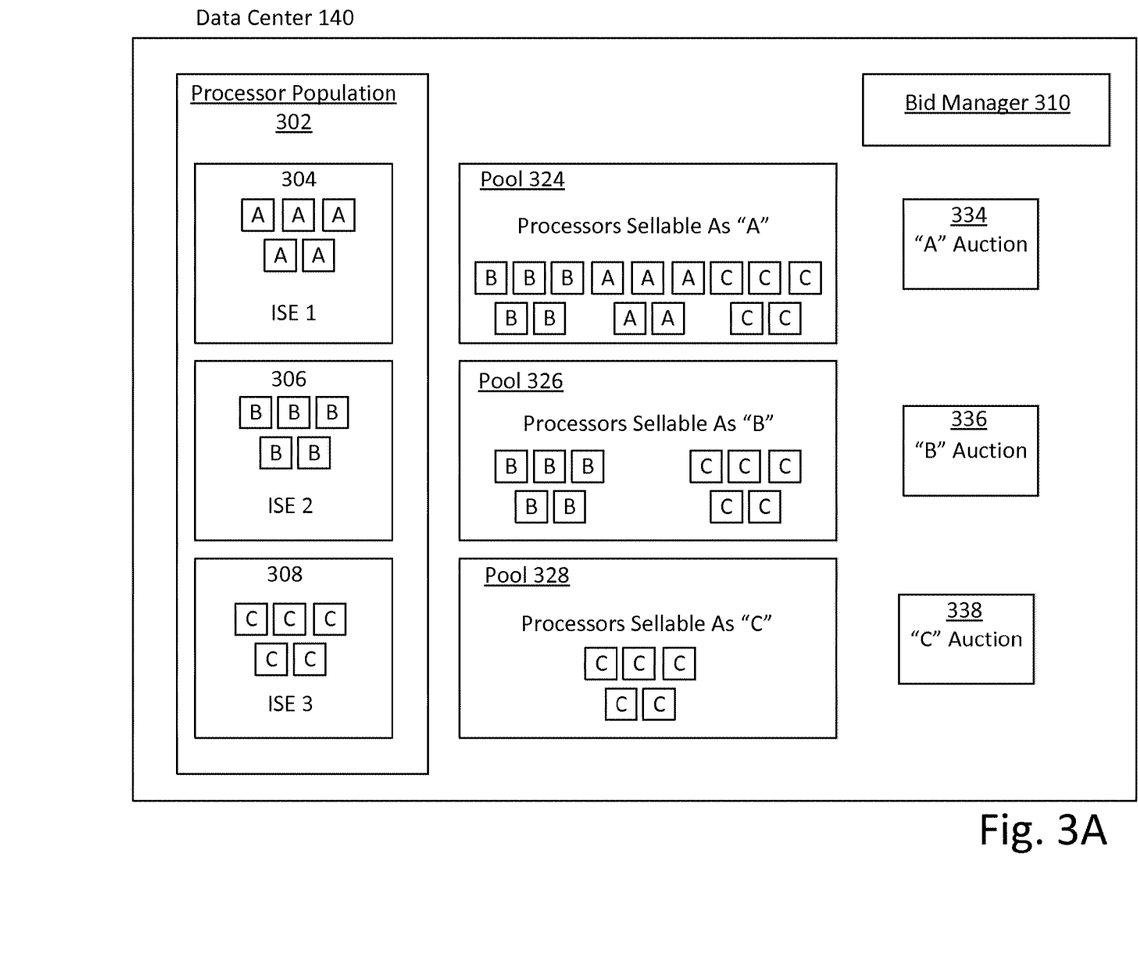
FIG. 3A depicts an example system with details relating to a bid manager.

FIG. 3A depicts an example system with details relating to a bid manager, arranged according to at least some embodiments described herein. Those components in FIG. 3A that are labeled identically to components of FIGS. 1 and 2 will not be described again for the purposes of clarity and brevity.

Data center 140 may include multiple processors. Customers of data center 140 may bid for access to various processors for execution of virtual machines at data center 140. Processors of data center 140 may include various ISEs. In some examples, processors of data center 140 may be logically grouped into a processor population 302, by a bid manager 310, for purposes of categorizing processors for bidding. Processors which include the same ISEs in processor population 302 may be grouped together. For example, processor group 304 may include processors designated as type A processors. In the example, type A processors may include one or more instruction set extensions designated as "ISE 1." In the example, processor group 306 may include processors designated as type B processors. In the example, type B processors may include one or more instruction set extensions designated as "ISE 2." In some examples, ISE 1 may include instruction set extensions that may be a subset (explained further below) of instruction set extensions in ISE 2. In a further example, processor group 308 may include processors designated as type C processors. In the example, type C processors may include one or more instruction set extensions designated as "ISE 3." In some examples, ISE 2 may include instruction set extensions that may be a subset of instruction set extensions in ISE 3.

In the examples above, a type B processor may be effective to perform all the functions of a type A processor, as ISE 1 may be a subset of ISE 2. That is to say, ISE 2 may include all the instruction set extensions of ISE 1. In some other examples, a type C processor may be effective to perform all the functions of a type A processor or a type B processor, as ISE 3 may include all instruction set extensions of ISE 2 and ISE 1.

Accordingly, bid manager 310 may place processors in pools 324, 326, and/or 328. Bid manager module 310 may be hardware or some combination of hardware and instructions executable on the hardware, effective to pool and auction off processors to various bidders. Pool 324 may identify all processors sellable and/or controllable as type A processors. In the example depicted in FIG. 3A, the five type A processors from processor group 304 may be sellable and/or controllable as type A processors because they are, in fact, type A processors. The five type B processors from processor group 306 may be sellable and/or controllable as type A processors because type B processors include ISE 2, of which ISE 1 may be a subset. Therefore, type B processors may include all instruction set extensions of type A processors. The five type C processors from processor group 308 may be sellable and/or controllable as type A processors because type C processors include ISE 3, of which ISE 1 may be a subset. Therefore, type C processors may include all instruction set extensions of type A processors. Consequently, in the example, pool 324 may include fifteen processors including type A, type B, and/or type C processors.

Similarly, pool 326 may identify all processors sellable and/or controllable as type B processors. In the example, pool 326 may include the five type B processors from processor group 306 and the five type C processors from processor group 308. Consequently, in the example, pool 326 may include ten processors including type B and/or type C processors. Pool 328 may identify all processors sellable and/or controllable as type C processors. In the example, pool 328 may include the five type C processors from processor group 308, as only type C processors include ISE 3.

An "A" auction 334 may be held for processing on processors which are capable of executing instructions for ISE 1. In an example, if a number of bids received for "A" auction 334 is greater than a quantity of type A processors, some of the bids may be copied to a "B" auction 336 and a "C" auction 338. In some examples, bid manager 310 may receive bids that include requests that a processor includes a particular ISE and other bids that do not include requests that a processor includes a particular ISE.

Figure 3B:
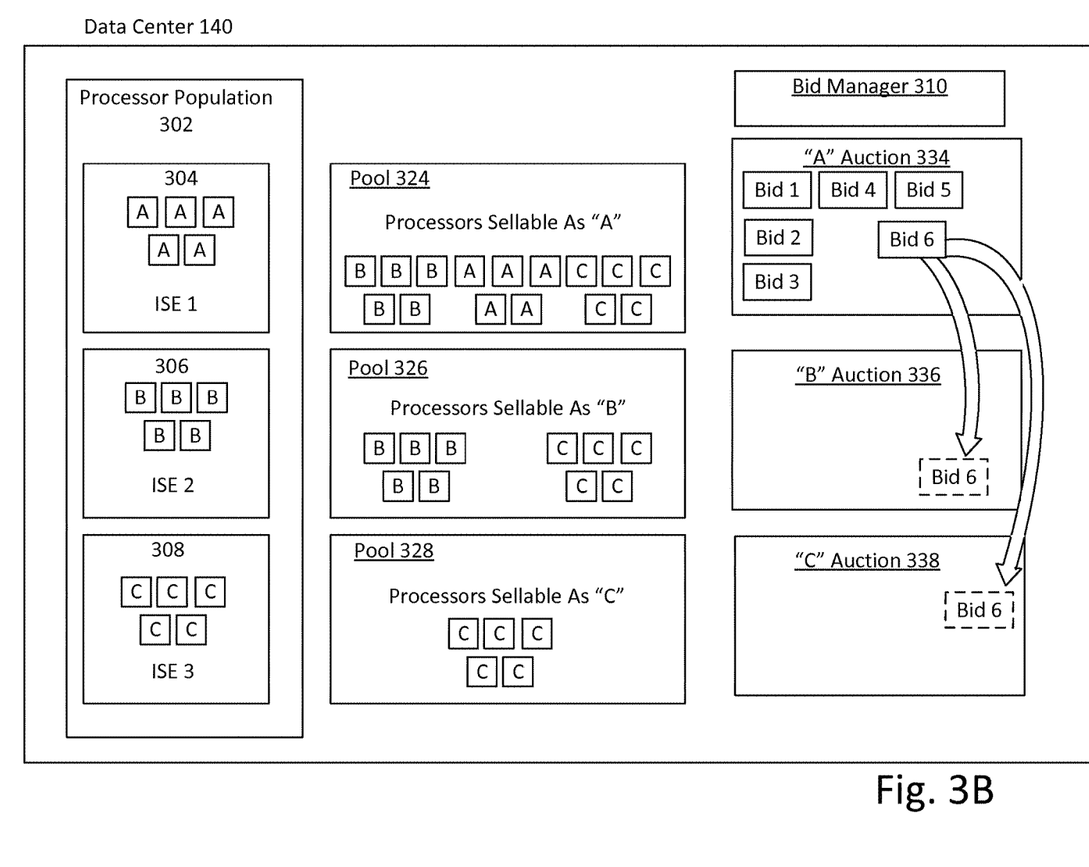
FIG. 3B depicts the example data center of FIG. 3A, including additional details related to the bid manager.

FIG. 3B depicts example system 100 of FIGS. 1, 2, and 3A with additional details relating to bid manager 310, arranged according to at least some embodiments described herein. Those components in FIG. 3B that are labeled identically to components of FIGS. 1, 2, and 3A will not be described again for the purposes of clarity and brevity.

In an example, bid manager 310 may receive six bids in "A" auction 334, including Bid 1, Bid 2, Bid 3, Bid 4, Bid 5, and Bid 6. In the example, some bids values may be greater than other bid values. For example, the bids may be arranged from the lowest value to the highest value. Bid 1 may represent the lowest bid value in "A" auction 334 and Bid 6 may represent the highest bid value in "A" auction 334. In the example, there may be only five type A processors. Accordingly, bid manager 310 may copy the highest bid (Bid 6 in the current example) from "A" auction 334 to "B" auction 336 and/or "C" auction 338, as type B processors and type C processors may perform all the functions of type A processors. In this way, a type C processor sold as a type A processor includes ISE 3. ISEs in ISE 1 may be a subset of ISE 3. In the example, those ISEs in ISE 3 which are not in ISE 1 may be veiled ISEs, as the type C processor was sold as a type A processor.

Figure 3C:
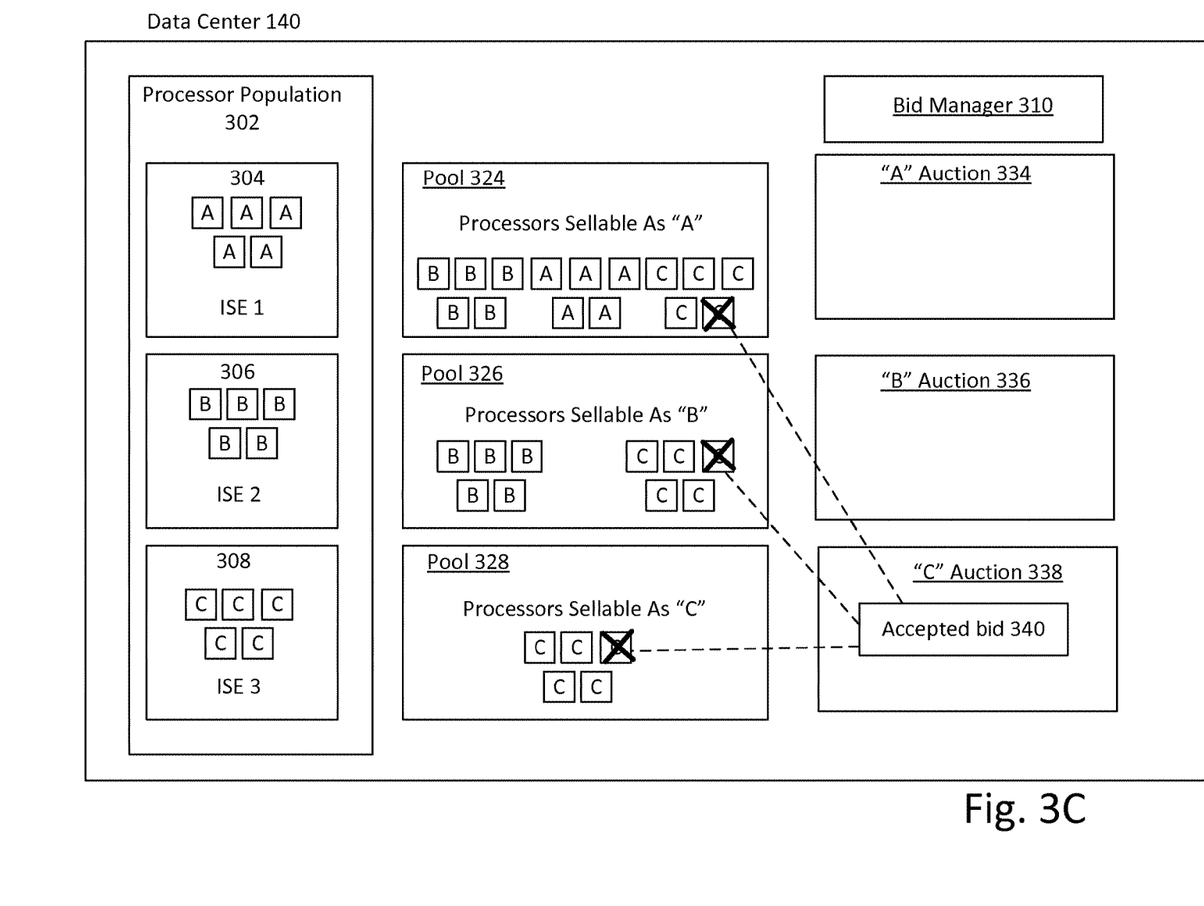
FIG. 3C depicts the example data center of FIGS. 3A and 3B, including additional details related to the bid manager.

FIG. 3C depicts example system 100 of FIGS. 1, 2, 3A, and 3B with additional details relating to bid manager 310, arranged according to at least some embodiments described herein. Those components in FIG. 3C that are labeled identically to components of FIGS. 1, 2, 3A, and 3B will not be described again for the purposes of clarity and brevity.

In an example, bid manager 310 may receive one or more bids for "C" auction 338. Bid manager 310 may accept a bid in "C" auction 338 (e.g., accepted bid 340). Accepted bid 340 may be accepted for processing on a type C processor. Consequently, bid manager 310 may reduce the quantity of type C processors in pools 324, 326, and 328 by one, based on the receipt of accepted bid 340. The quantity of type C processors in pools 324, 326, and 328 may be reduced by one, as one less type C processor may be available for bidding.

If a customer requires a particular set of instruction set extensions for a particular virtual machine, the customer may bid accordingly. For example, a customer requiring ISE 3, may bid in "C" auction 338, as only type C processors may include ISE 3. For example, a customer that needs to execute a computing task requiring ISE 3 will not bid on type B or type A processors, as type A and type B processors may be unable to execute the computing task or unable to meet required levels of service. If a bid is accepted for a type C processor, the accepted bid may be copied to "A" Auction 334 and "B" Auction 336, in order to reduce the quantity of type C processors that are now sellable and/or controllable as a type B or type A processor. At the conclusion of an auction for processors of data center 140, processors may be controlled according to the winning bids.

In some examples, bid manager 310 may provide information related to accepted bids to instruction set extension veiling module 112. For example, the information may be related to ISEs that were not purchased for a particular virtual machine. Instruction set extension veiling module 112 may conceal processor time savings realized through use of the particular ISEs.

Among other benefits, copying bids with a bid manager may allow for efficient use of processing resources in data centers. Customers that require greater processing power provided by instruction set extensions will only bid on those processors that have instruction set extensions which are able to meet their requirements. Additionally, customers will no longer have motivation to bid low in hopes that they will receive access to a processor with greater processing capability (or certain instruction set extensions), as customers will receive the level of processing for which they bid. Data centers employing a system in accordance with the disclosure may efficiently exploit processor usage by delegating saved processor time and/or clock cycles to other virtual machines or to the data center. Furthermore, data centers may realize benefits in terms of power consumption as less processing time may be required to perform client tasks when using instruction set extensions.

Figure 4:
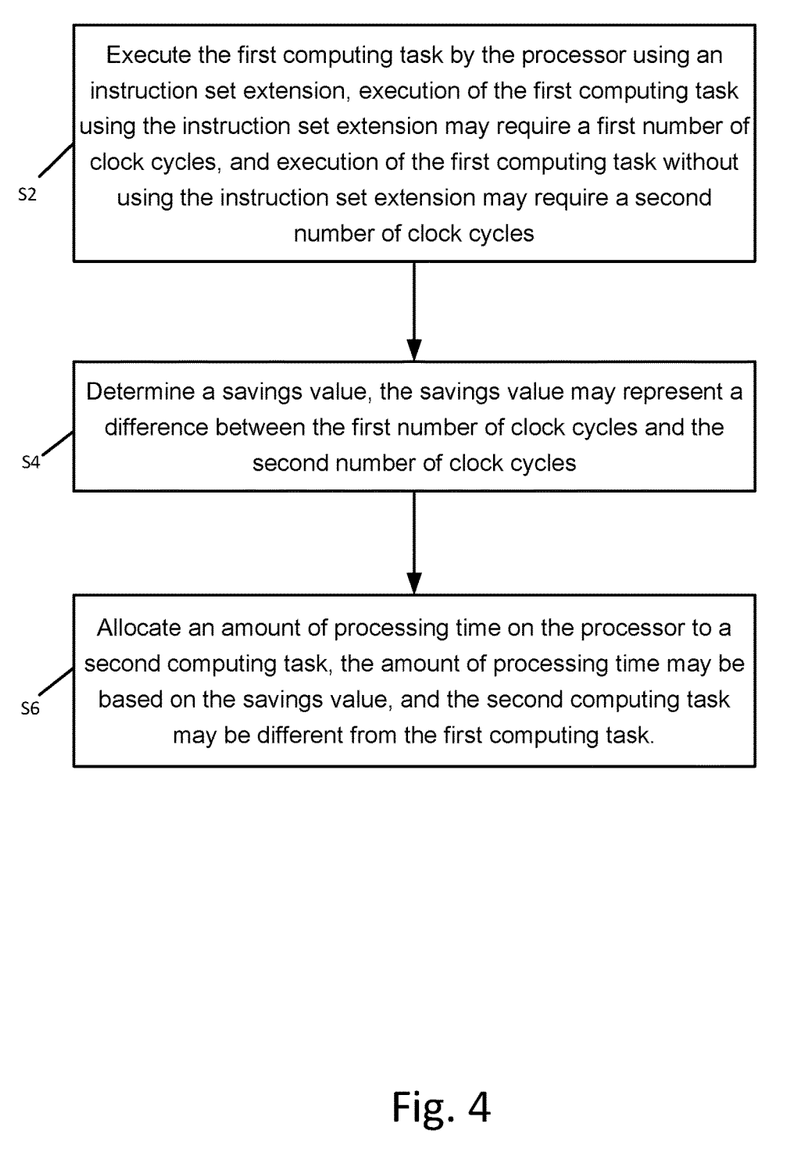
FIG. 4 depicts a flow diagram for an example process to implement instruction set extension concealment in data centers.

FIG. 4 depicts a flow diagram for an example process to implement instruction set extension concealment in data centers, arranged in accordance with at least some embodiments described herein. In some examples, the process in FIG. 4 could be implemented using system 100 discussed above and could be used to conceal instruction set extensions in data centers. An example process may include one or more operations, actions, or functions as illustrated by one or more of blocks S2, S4, S6 and/or S8. Although illustrated as discrete blocks, various blocks may be divided into additional blocks, combined into fewer blocks, or eliminated, depending on the desired implementation. In some examples, the process in FIG. 4 may be used by a virtual machine manager configured in communication with a processor and/or one or more instruction set extensions.

Processing may begin at block S2, "Execute the first computing task by the processor using an instruction set extension, execution of the first computing task using the instruction set extension may require a first number of clock cycles, and execution of the first computing task without using the instruction set extension may require a second number of clock cycles." At block S2, the first task may be executed by the processor using an instruction set extension. Execution of the first computing task using the instruction set extension may require a first number of clock cycles. Execution of the first computing task without using the instruction set extension may require a second number of clock cycles. In some examples, the first computing task may include a task performed by a virtual machine under execution by the processor. The second computing task may include execution of a second virtual machine by the processor. In some examples, the first virtual machine may be different from the second virtual machine. In some other examples, the second computing task may include a task performed for the data center and not for a virtual machine. In some examples where the first computing task includes a task performed by a virtual machine under execution by the processor, the virtual machine may include a driver effective to generate instruction set extension instructions. In various examples, the instruction set extension instructions may be effective to use the instruction set extension to execute the first computing task. In some examples, instructions from virtual machines may be translated into instruction set instructions. Instruction set instructions may be effective to use the instruction set extension.

Processing may continue from block S2 to block S4, "Determine a savings value, the savings value may represent a difference between the first number of clock cycles and the second number of clock cycles." At block S4, a savings value may be determined. The savings value may represent a difference between the first number of clock cycles consumed using the instruction set extension and the second number of clock cycles consumed without using the instruction set extension. In some examples, a clock time of a virtual machine associated with the first computing task may be adjusted so that the clock time indicates that the second number of clock cycles may have elapsed during execution of the first computing task.

Processing may continue from block S4 to block S6, "Allocate an amount of processing time on the processor to a second computing task, the amount of processing time may be based on the savings value, and the second computing task may be different from the first computing task." At block S6, an amount of processing time on the processor may be allocated to a second computing task. The amount of processing time may be based on the savings value. The second computing task may be different from the first computing task. In some examples, the second computing task may include execution of a virtual machine. In various other examples, allocating an amount of processing time on the processor to the second computing task may include determining a number of times that the first computing task uses the instruction set extension. Allocating an amount of processing time on the processor to the second computing task may further include multiplying the savings value by the number of times to determine a total savings value. In some other examples, the amount of processing time may be further based on the total savings value.

Figure 5:
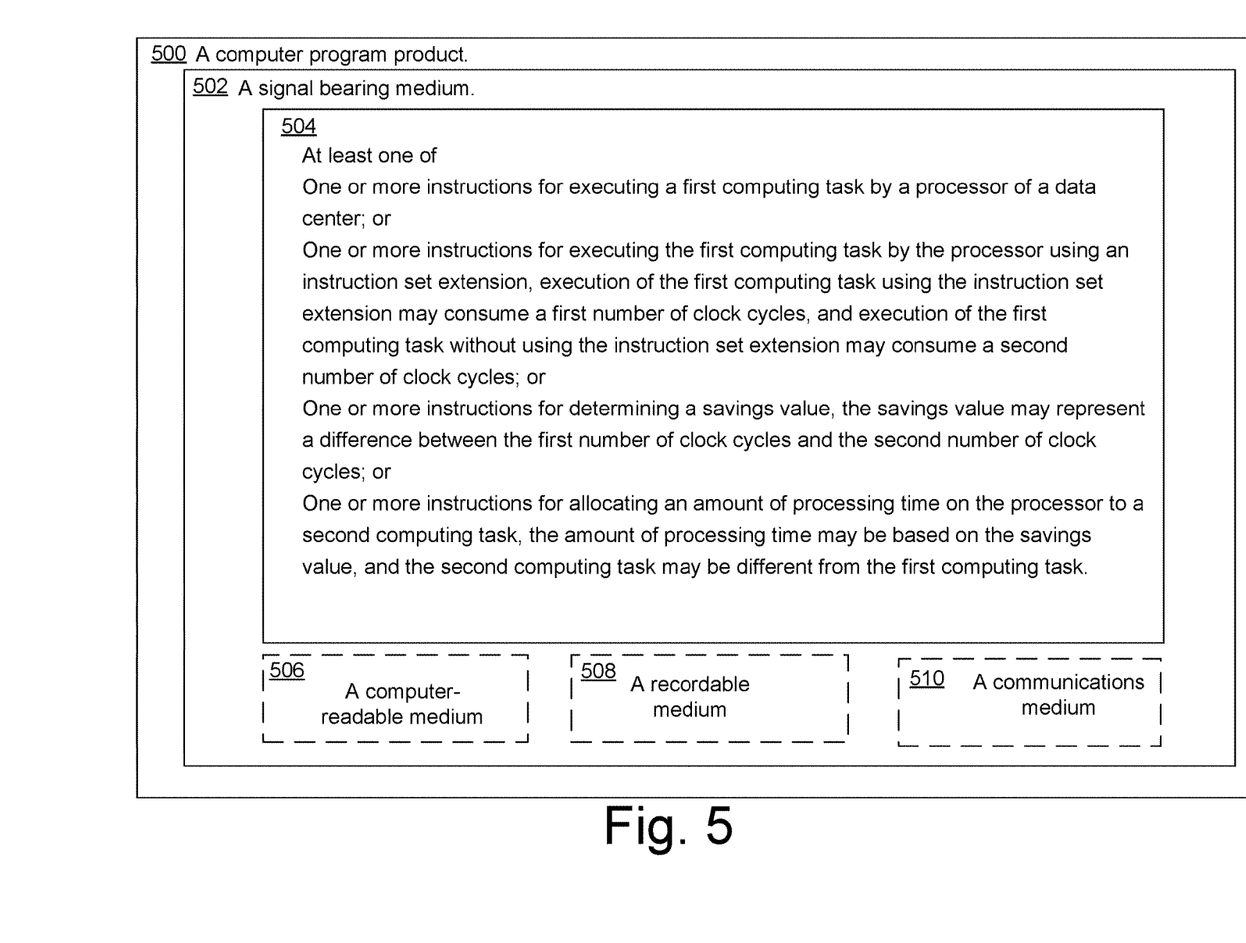
FIG. 5 illustrates an example computer program product that can be utilized to implement instruction set extension concealment in data centers.

FIG. 5 illustrates an example computer program product 500 that can be utilized to implement instruction set extension concealment in data centers arranged in accordance with at least some embodiments described herein. Computer program product 500 may include a signal bearing medium 502. Signal bearing medium 502 may include one or more instructions 504 that, when executed by, for example, a processor, may provide the functionality described above with respect to FIGS. 1-4. Thus, for example, referring to system 100, instruction set extension veiling module 112 may undertake one or more of the blocks shown in FIG. 5 in response to instructions 504 conveyed to the system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
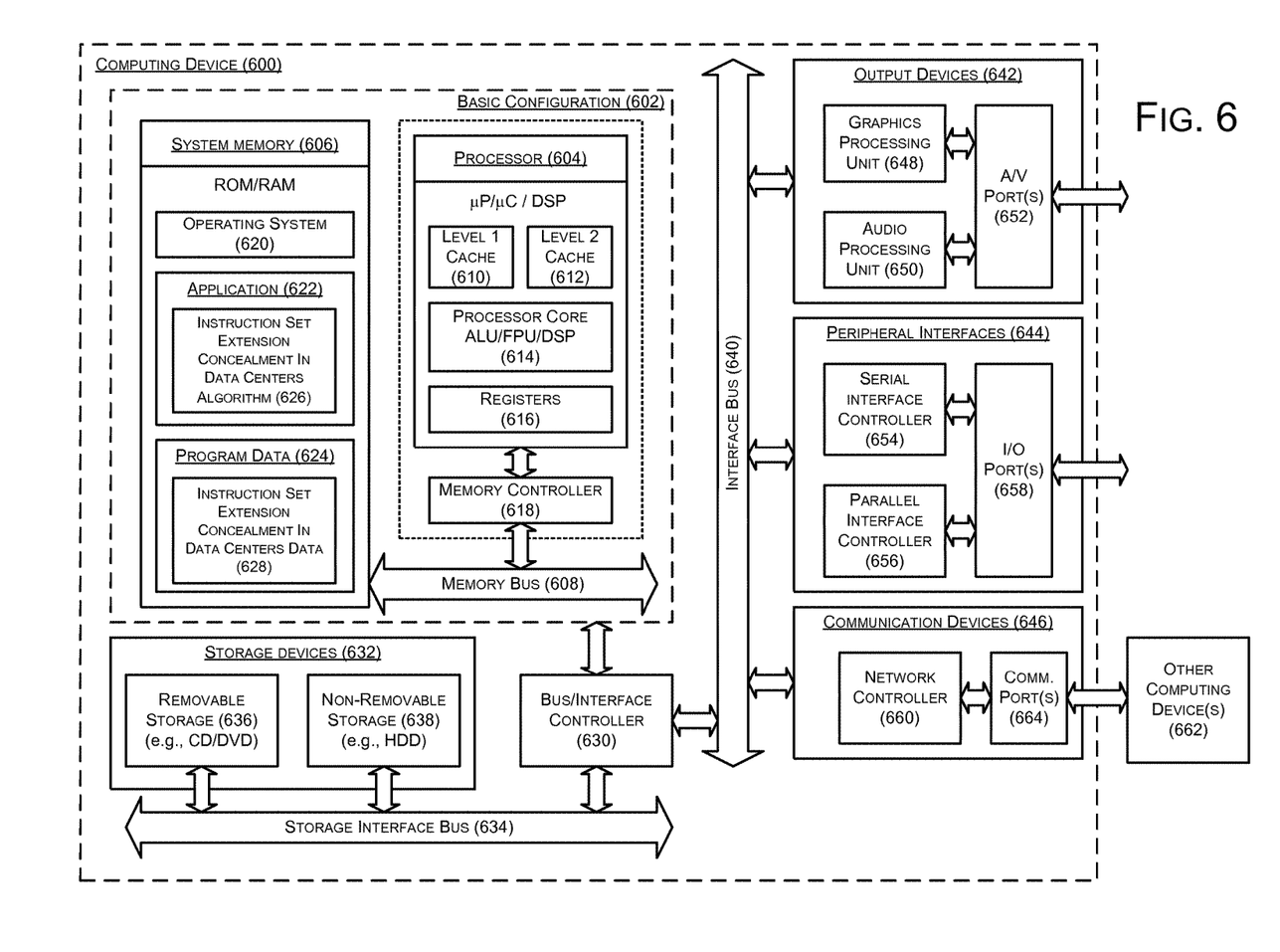
FIG. 6 is a block diagram illustrating an example computing device that is arranged to implement instruction set extension concealment in data centers; all arranged according to at least some embodiments described herein.

FIG. 6 is a block diagram illustrating an example computing device 600 that is arranged to implement instruction set extension concealment in data centers arranged in accordance with at least some embodiments described herein. In a very basic configuration 602, computing device 600 typically includes one or more processors 604 (such as processor 150) and a system memory 606 (such as system memory 160). A memory bus 608 may be used for communicating between processor 604 and system memory 606.

Depending on the desired configuration, processor 604 may be of any type including but not limited to a microprocessor (µP), a microcontroller (µC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622 and program data 624. Application 622 may include an instruction set extension concealment in data centers algorithm 626 that is arranged to perform the functions as described herein including those described with respect to system 100 of FIGS. 1-5. Program data 624 may include instruction set extension concealment in data centers data 628 that may be useful to implement instruction set extension concealment in data centers as is described herein. In some embodiments, application 622 may be arranged to operate with program data 624 on operating system 620 such that instruction set extension concealment in data centers may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method to execute a first computing task by a processor of a data center, the method comprising:
   executing the first computing task by the processor using an instruction set extension, wherein execution of the first computing task using the instruction set extension requires a first number of clock cycles, and wherein execution of the first computing task without using the instruction set extension requires a second number of clock cycles;

determining a savings value, wherein the savings value represents a difference between the first number of clock cycles and the second number of clock cycles; and allocating an amount of processing time on the processor to a second computing task, wherein the amount of processing time is based on the savings value, and wherein the second computing task is different from the first computing task.

2. The method of claim 1, wherein:
the first computing task includes a task performed by a first virtual machine being executed by the processor;
the second computing task includes a task performed by a second virtual machine being executed by the processor; and
the first virtual machine is different from the second virtual machine.

3. The method of claim 1, wherein:
the processor is effective to execute a virtual machine;
the first computing task includes a task performed by the virtual machine; and
the second computing task includes a task performed for the data center and not for the virtual machine.

4. The method of claim 1, wherein:
the first computing task includes a task performed by a virtual machine under execution by the processor; and
the virtual machine includes a driver effective to generate instruction set extension instructions, wherein the instruction set extension instructions are effective to use the instruction set extension to execute the first computing task.

5. The method of claim 1, wherein the first computing task includes a task performed by a virtual machine under execution by the processor, and the method further comprises:
receiving an instruction to be executed by the processor;
translating the instruction into an instruction set instruction, wherein the instruction set instruction is effective to use the instruction set extension.

6. The method of claim 1, wherein allocating an amount of processing time on the processor to the second computing task comprises:
determining a number of times that the first computing task uses the instruction set extension; and
multiplying the savings value by the number of times to determine a total savings value;
wherein the amount of processing time is further based on the total savings value.

7. The method of claim 1, wherein the first computing task includes a task performed by a virtual machine under execution by the processor, and the method further comprises:
adjusting a clock time of the processor so that the clock time indicates that the second number of clock cycles have elapsed during execution of the first computing task; and
reporting the adjusted clock time to the virtual machine.

8. A data center comprising:
a processor;
an instruction set extension configured to be in communication with the processor; and
a memory configured to be in communication with the processor, the memory effective to store instructions;
the processor being effective to, in accordance with the instructions:
execute a first computing task through use of the instruction set extension, wherein execution of the first computing task through use of the instruction set extension requires a first number of clock cycles, and wherein execution of the first computing task without use of the instruction set extension requires a second number of clock cycles;
determine a savings value, wherein the savings value represents a difference between the first number of clock cycles and the second number of clock cycles; and
allocate an amount of processing time on the processor to a second computing task, wherein the amount of processing time is based on the savings value, and wherein the second computing task is different from the first computing task.

9. The data center of claim 8, wherein the processor is a first processor, and the data center further comprises a second processor configured to be in communication with the first processor, wherein the second processor is effective to:
receive first bids to execute first virtual machines on the first processor, wherein the first bids include a request that the first processor includes the instruction set extension;
receive second bids to execute second virtual machines on the first processor, wherein the second bids do not include the request that the first processor includes the instruction set extension.

10. The data center of claim 8, wherein:
the first computing task includes a task performed by a first virtual machine under execution by the processor;
the second computing task includes execution of a second virtual machine by the processor; and
the first virtual machine is different from the second virtual machine.

11. The data center of claim 8, wherein:
the processor is further effective to execute a virtual machine;
the first computing task includes a task performed by the virtual machine; and
the second computing task includes a task performed for the data center and not for the virtual machine.

12. The data center of claim 8, wherein:
the first computing task includes a task performed by a virtual machine under execution by the processor; and
the virtual machine includes a driver effective to generate instruction set extension instructions, wherein the instruction set extension instructions are effective to use the instruction set extension.

13. The data center of claim 8, wherein the first computing task includes a task performed by a virtual machine under execution by the processor, and wherein the processor is further effective to, in accordance with the instructions:
translate a received instruction into an instruction set instruction, wherein the instruction set instruction is effective to use the instruction set extension.

14. The data center of claim 8, wherein to allocate the amount of processing time, the processor is effective to:
determine a number of times that the first computing task calls an instruction to use the instruction set extension; and multiply the savings value by the number of times to determine a total savings value, wherein the amount of processor time is further based on the total savings value.

15. The data center of claim 8, wherein the first computing task includes a task performed by a virtual machine under execution by the processor, and wherein the processor is further effective to:
adjust a clock time of the processor so that the clock time indicates that the second number of clock cycles have elapsed during execution of the first computing task; and
report the adjusted clock time to the virtual machine.

16. A system effective to execute a first computing task of a data center, the system comprising:
a memory;
an instruction set extension;
a processor configured to be in communication with the memory and the instruction set extension, the processor being configured to:
execute the first computing task with use of the instruction set extension, wherein execution of the first computing task with use of the instruction set extension requires a first number of clock cycles, and wherein execution of the first computing task without use of the instruction set extension requires a second number of clock cycles;
determine a savings value, wherein the savings value represents a difference between the first number of clock cycles and the second number of clock cycles;
determine a number of times that the first computing task uses the instruction set extension;
multiply the savings value by the number of times to determine a total savings value; and
allocate an amount of processing time on the processor to a second computing task, wherein the amount of processing time is based on the savings value and the total savings value, and wherein the second computing task is different from the first computing task.

17. The system of claim 16, wherein:
the processor is further configured to execute a virtual machine; and
the first computing task includes a task performed by the virtual machine.

18. The system of claim 17, wherein the second computing task includes a task that is not performed for the virtual machine.

19. The system of claim 17, wherein:
the second computing task includes a task performed by a second virtual machine being executed by the processor; and
the first virtual machine is different from the second virtual machine.

20. The system of claim 16, wherein:
the first computing task includes a task performed by a virtual machine under execution by the processor; and
the virtual machine includes a driver effective to generate instruction set extension instructions, wherein the instruction set extension instructions are effective to use the instruction set extension.

21. The system of claim 16, wherein the first computing task includes a task performed by a virtual machine under execution by the processor, and wherein the processor is further configured to, in accordance with the instructions:
translate a received instruction into an instruction set instruction, wherein the instruction set instruction is effective to use the instruction set extension.

22. The system of claim 16, wherein the first computing task includes a task performed by a virtual machine under execution by the processor, and the processor is further configured to:
adjust a clock time of the processor so that the clock time indicates that the second number of clock cycles have elapsed during execution of the first computing task; and
report the adjusted clock time to the virtual machine.

23. The system of claim 16, wherein the processor is a first processor, and the system further comprises a second processor configured to be in communication with the first processor, wherein the second processor is effective to:
receive first bids to execute first virtual machines on the first processor, wherein the first bids include a request that the first processor includes the instruction set extension;
receive second bids to execute second virtual machines on the first processor, wherein the second bids do not include the request that the first processor includes the instruction set extension.

* * * * *